Figure 1A:
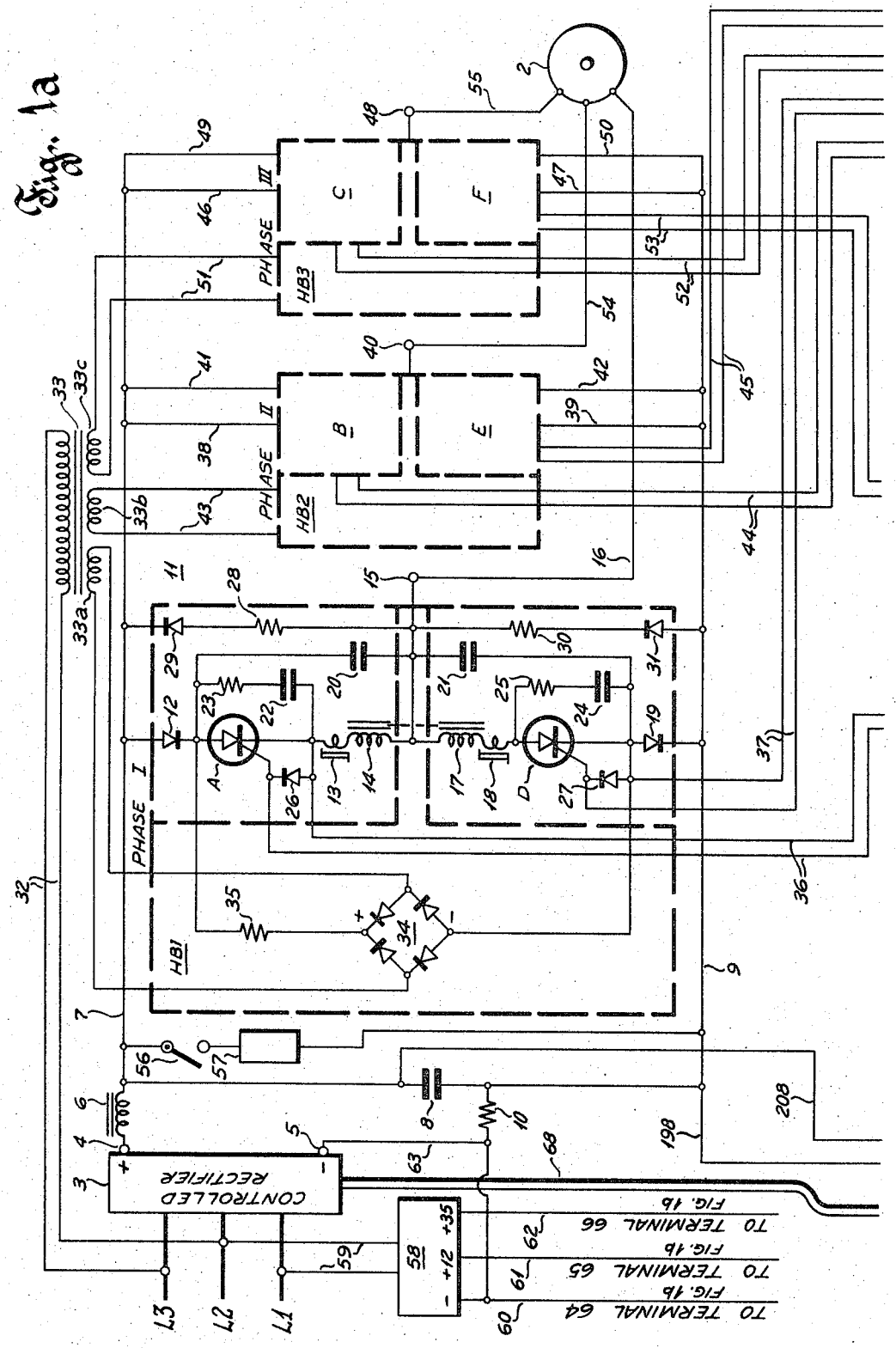

Jan. 23, 1968  R. L. RISBERG  3,365,638
MULTIPHASE INVERTER SYSTEM WITH PHASE REVERSAL
Filed Oct. 13, 1965  4 Sheets-Sheet 1

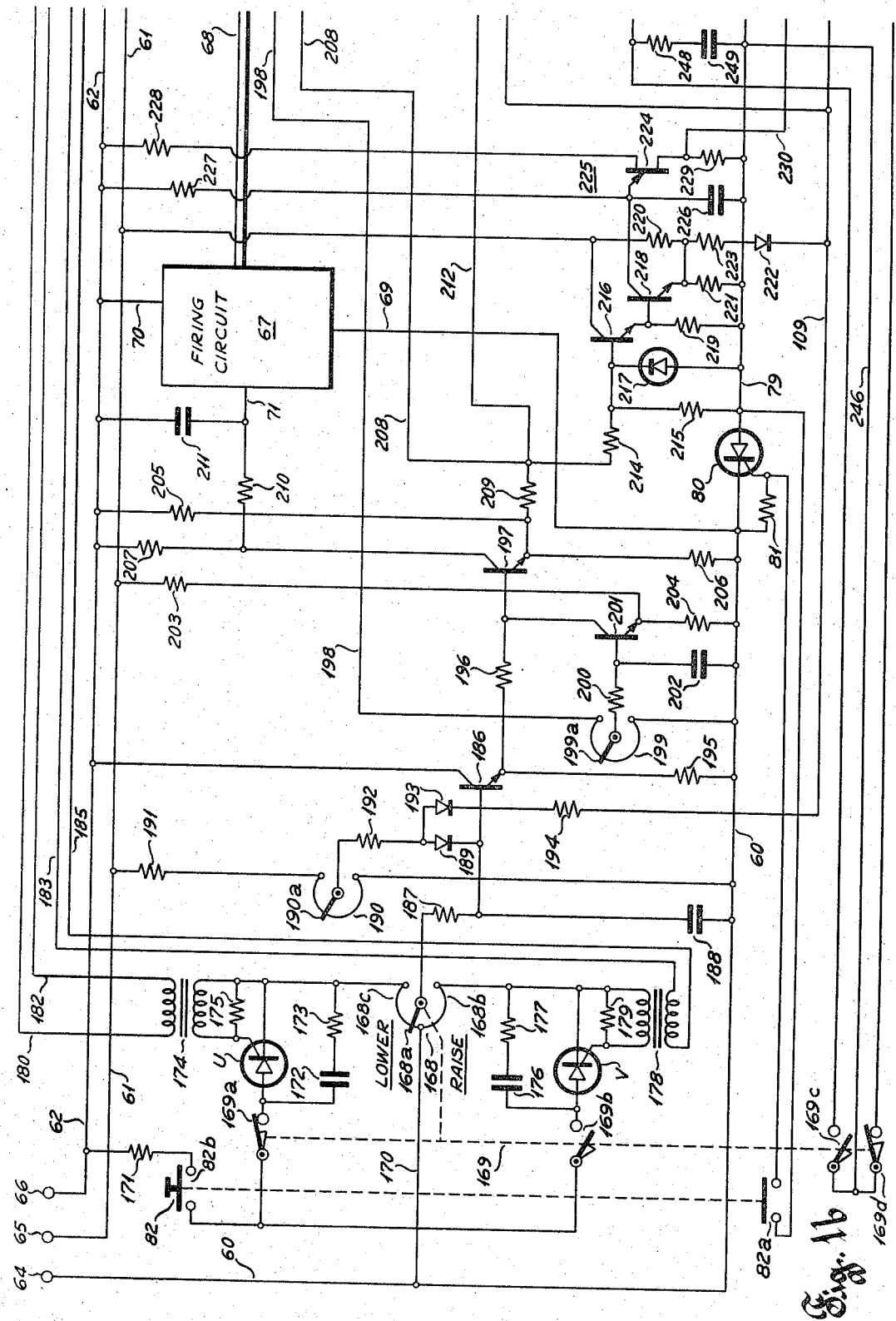

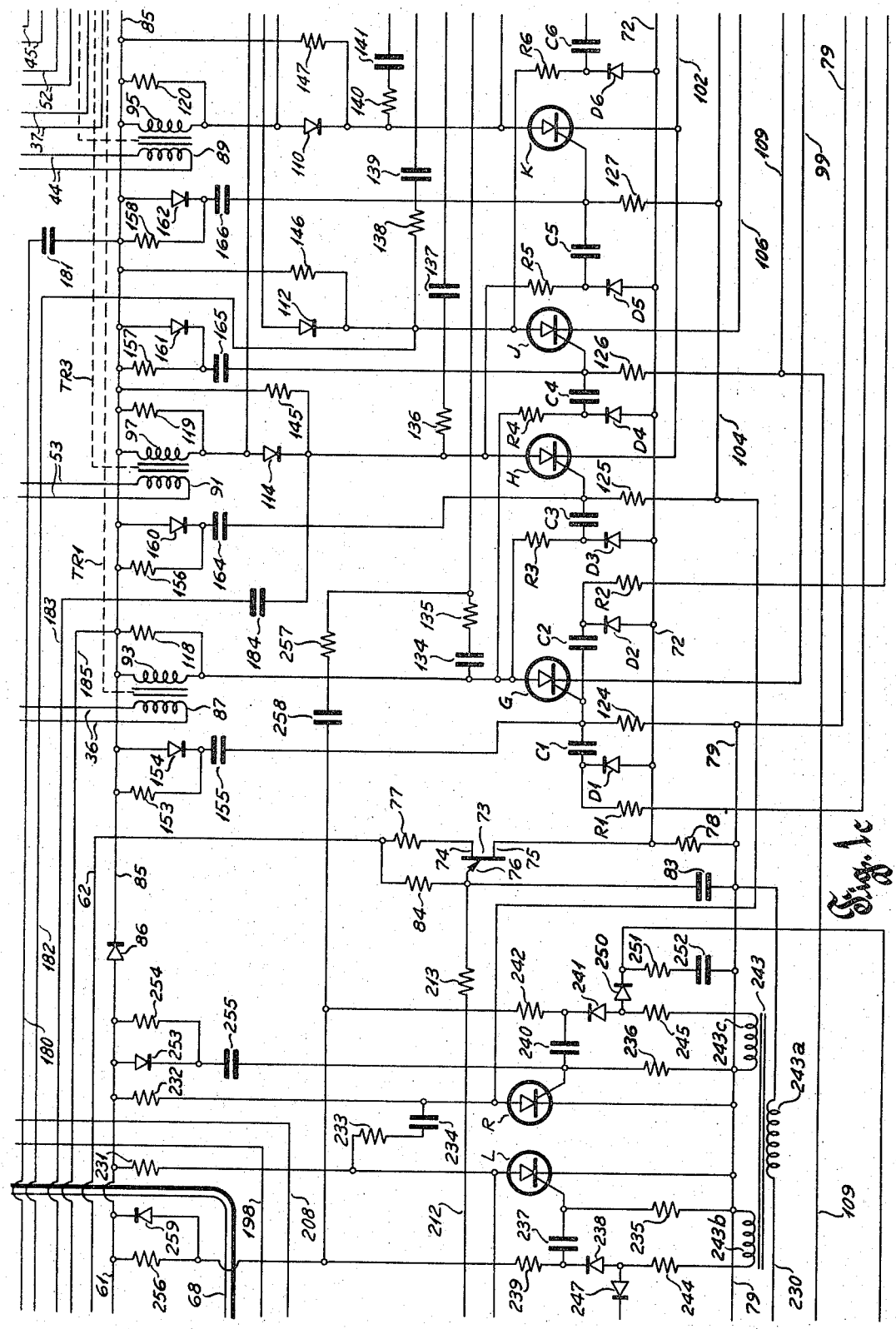

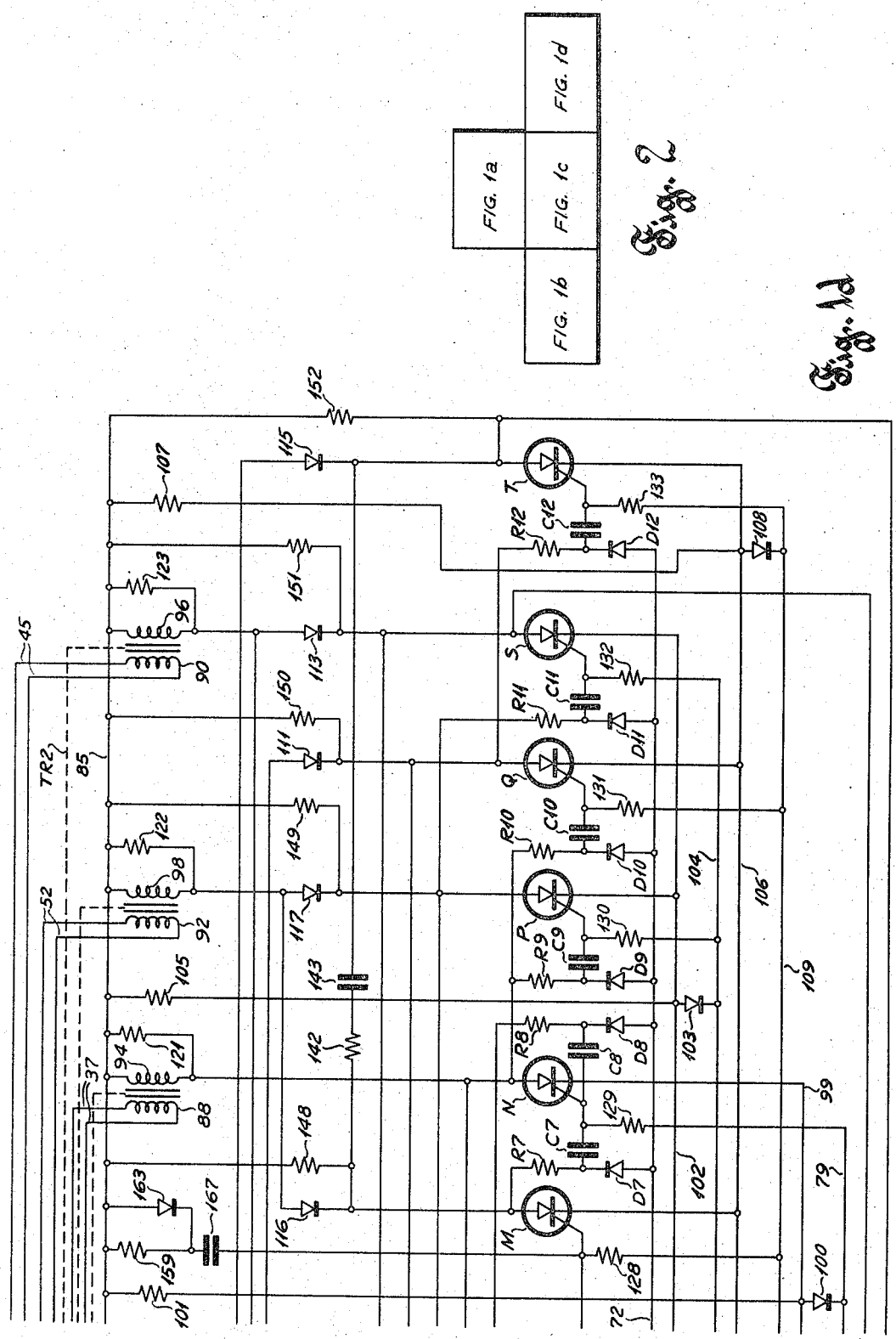

United States Patent Office 3,365,638
Patented Jan. 23, 1968

3,365,638
MULTIPHASE INVERTER SYSTEM WITH PHASE REVERSAL
Robert L. Risberg, Milwaukee, Wis., assignor to Cutler-Hammer, Inc., Milwaukee, Wis., a corporation of Delaware
Filed Oct. 13, 1965, Ser. No. 495,595
22 Claims. (Cl. 318—207)

This invention relates to inverter systems for converting D.C. electrical power to muliphase A.C. and including means for reversing the phase order. This invention more particularly relates to inverter systems of the type described which are of the solid state type and adapted for powering and reversing A.C. motors of multiphase type.

It is an object of this invention to prove an improved variable frequency multiphase A.C. motor reversing system wherein the reversing control function is accomplished by phase reversal with static control elements at low power levels.

It is another object of the invention to provide in a system as described, automatic controls for reversing the motor without removing the motor terminal voltage and therefore without losing torque during reversal while powering an active load such as a hoist.

It is still another object of this invention to provide a system of the aforedescribed type in which reversal is permitted only on a restricted low range of speed or plugging zone.

It is a more specific object of this invention to provide such a system in which the plugging zone is unsymmetrical in that reversal is permitted at different low speeds depending on the initial direction of rotation of the motor.

It is a further object of this invention to provide a motor reversing system of the aforedescribed general type in which phase reversal is permitted by logic circuitry incorporated in a solid state firing circuit only at the proper point in the power voltage cycle to prevent saturation of the motor upon reversal.

It is a still further object of this invention to provide improved speed setting controls in a system of the aforedescribed type.

The objects of the invention are accomplished by providing a variable frequency three phase-bridge type inverter, preferably of the silicon controlled rectifier type, with a firing circuit having means for reversing two of the three phases of inverter output power to thereby reverse the order of all three phases. The basic inverter system without phase reversal is similar to that described in the copending R. L. Risberg application Ser. No. 381,970, filed July 13, 1964, and the firing circuit without phase reversal is similar to that described in copending R. L. Risberg application Ser. No. 382,270, filed July 13, 1964, both applications being assigned to the assignee of this invention. The firing circuit of the presently disclosed system comprises a series of ten SCR's or silicon controlled rectifiers, two of these SCR's being connected through appropriate circuitry to always control one phase of power current by controlling, respectively, two legs of the six-legged bridge type inverter. The other two phases are each provided with two sets of controlling SCR's, four controlling SCR's for the forward direction and four SCR's for the reverse direction. Each of the second and third phases has two legs and each leg has two alternately controlling SCR's associated therewith. The two sets of controlling SCR's for the second and third phases are made alternately controlling by switching means. Further, the two sets are fired in different orders with respect to the others of the same set and to the controlling SCR's for the first phase. As the sets of controlling SCR's are changed, the firing order of the power SCR's of the inverter is changed to thereby reverse the phase relationship of the three phases of power.

The invention disclosed is further provided with circuit means for sensing the inverter output voltage and permitting operation of the aforementioned switching means at only low output voltage. Where the inverter powers a motor, this feature prevents phase reversal at high motor speeds. The speed at which phase reversal is permitted is made different for opposite directions of motor rotation by circuit means sensitive to the phase rotation for shifting the bias of a transistor at a stage of the circuitry of the aforementioned voltage magnitude sensing means.

The invention is also provided with logic circuitry incorporated in the inverter firing circuit to permit reversal of phase II and phase III of three-phase power only at the time phase I goes negative. At this time the state of the field flux in phase I is maximum and in phase II and III is equal to one-half of maximum regardless of the direction of phase rotation. If the switching is done at this time with the initial conditions equal to the steady state value for either direction of phase rotation, there will be no transient response and saturation of the motor is avoided.

In addition an improved manual speed setting and direction control is provided. This control element is manually operable to any position when desired, but, upon movement to a reversing position, the output reference of the speed setter is not energized until after phase reversal occurs. During the interim a minimum speed reference signal is supplied from another source and this latter source is made unsymmetrical in that the minimum speed signal differs depending on the direction of rotation of the motor. This feature has utility in load situations such as exist in hoists.

A more complete understanding of the invention will be had and other objects and advantages will appear upon referring to the following description and claims.

While the motor control system hereinafter described is adapted to fulfill the objects stated, it is to be understood that it is not intended that the invention be confined to the particular preferred embodiment disclosed, since it is susceptible of various modifications without departing from the scope of the appended claims.

In the drawings:

FIGURES 1a through 1d constitute a circuit diagram of a motor control system embodying the claimed invention; and FIG. 2 is a diagram showing the relationship of FIGS. 1a through 1d and how they may be assembled to form a complete diagram.

Referring to the drawings, there is shown a three-phase squirrel cage motor 2. The power circuitry for suppling motor 2 includes input lines L1, L2 and L3 for supplying three-phrase A.C. to controlled rectifier 3 which has a positive output terminal 4 and a negative output terminal 5. A smoothing inductance 6 is connected in series with a positive D.C. conductor 7. A filter capacitor 8 is connected between the positive conductor 7 and a negative conductor 9. An IR drop resistor 10 is included in the power loop in series with negative conductor 9.

Conductors 7 and 9 supply power to the input of a variable frequency A.C. inverter 11 of a type more completely described in the copending R. L. Risberg application Ser. No. 381,969, filed July 13, 1964, and assigned to the present assignee. The inverter 11 comprises three two-legged half-bridges HB1, HB2 and HB3 connected in parallel across supply conductor 7 and 9 to form a parallel inverter of a three-phase bridge type. The upper portions of half-bridges HB1-3 are provided with silicon controlled rectifiers A, B and C, respectively, and the lower portions thereof are provided with silicon controlled rectifiers D, E and F, respectively. Since half-bridges HB2 and HB3 are similar to half-bridge HB1, only the latter will be described in detail, half-bridges HB2 and HB3 being shown schematically to avoid unnecessary duplication.

The power circuit of half-bridge HB1 extends from conductor 7 through a unidirectional conducting diode 12, silicon controlled rectifier A, an inductor 13 and a commutating inductor winding 14 to an inverter output terminal 15. A conductor 16 connects terminal 15 to the motor 2. In the lower half of half-bridge HB1 a power circuit extends from terminal 15 through a commutating inductor winding 17, an inductor 18, silicon controlled rectifier D and a unidirectional conducting diode 19 to conductor 9. Inductors 13 and 18 are of the square hysteresis loop type and are connected in series with silicon controlled rectifiers A and D, respectively, for protecting the associated silicon controlled rectifiers from rapid changes in current. Inductor windings 14 and 17 are wound upon a common core as indicated by the dashed line and are poled so that a rapid increase in current through one leg of the half-bridge will induce in the inductor winding of the opposite leg a reverse voltage tending to turn off the silicon controlled rectifier of the opposite leg. A commutating capacitor 20 is connected between the anode of silicon controlled rectifier A and terminal 15. Similarly, a commutating capacitor 21 is connected between terminal 15 and the cathode of silicon controlled rectifier D.

A smaller capacitor 22 and a small resistor 23 are connected in series across silicon controlled rectifier A between the anode and cathode thereof. A similar capacitor 24 and resistor 25 are connected in series across silicon controlled rectifier D. These circuits function to slow down the rate of change of voltage across the silicon controlled rectifiers and to absorb recovery transients thereon.

Diodes 26 and 27 are placed between the cathodes and gates of the silicon controlled rectifiers A and D, respectively, to limit the magnitude of reverse bias voltage which may be applied to the gates thereof.

To provide a path of current flow due to the induced voltage of the inductors of each leg of the half-bridges and the induced voltages of the motor, each leg of each half-bridge is provided with a unidirectional voltage control or feedback circuit thereacross. For this purpose, a resistor 28 and a diode 29 are connected in series from terminal 15 to conductor 7 to allow current flow in a reverse direction in shunt of inductor winding 14, inductor 13, silicon controlled rectifier A and diode 12. In a similar manner a resistor 30 and a diode 31 are connected in series from conductor 9 to terminal 15 in shunt of diode 19, silicon controlled rectifier D, inductor 18 and inductor winding 17.

Each half-bridge of inverter 11 is provided with a separate direct current source for precharging the commutating capacitors associated therewith. For this purpose a pair of conductors 32 connect A.C. power conductors L2 and L3 to the primary winding of a transformer 33. A secondary winding 33a supplies current to a rectifier bridge 34. The positive output of bridge 34 is connected to a resistor 35 to the junction of diode 12 and silicon controlled rectifier A. The negative output of bridge 34 is connected to the junction of silicon controlled rectifier D and diode 19. The output of bridge 34 is thereby connected across commutating capacitors 20 and 21 in series. A function of diodes 12 and 19 is to trap the charging voltage of capacitors 20 and 21 and permit the charging thereof to a voltage higher than that appearing across D.C. conductors 7 and 9.

A pair of conductors 36 are connected to the cathode and gate of silicon controlled rectifier A for the purpose of supplying a firing signal to the gate of silicon controlled rectifier A. Similarly, a pair of conductors 37 are connected to the cathode and gate of silicon controlled rectifier D for supplying a firing signal thereto.

Correspondingly, half-bridge HB2 has input conductors 38 and 39, an output terminal 40, feedback conductors 41 and 42 and bridge charging current conductors 43 leading from a secondary winding 33b. Further, conductor pairs 44 and 45 supply firing voltage signals to silicon controlled rectifiers B and E, respectively. Similarly, half-bridge HB3 has input conductors 46 and 47, feedback conductors 49 and 50, an output terminal 48 and precharging current conductors 51 leading from a secondary winding 33c. Conductor pairs 52 and 53 supply firing voltage signals to silicon controlled rectifiers C and F, respectively. Conductors 54 and 55 connect output terminal 40 and 48, respectively, to the motor 2.

Dynamic braking means are provided by a dynamic braking switch 56 and an electrical energy absorbing device 57. The latter may be a suitable resistance and may be stepped in relation to motor speed as is well known in the art. For a detailed description of a static controlled dynamic braking device suited for this use, reference may be had to the copending R. L. Risberg application Ser. No. 495,656, filed October 13, 1965, and assigned to the present assignee. Switch 56 and device 57 are connected across D.C. power conductors 7 and 9 to absorb current which is regenerated through the feed-back paths consisting of diodes 29 and 31, resistors 28 and 30, and conductors 41, 42, 49 and 50.

The control circuits for the inverter system are supplied with operating voltages from a direct current source 58 which is in turn supplied from a pair of conductors 59 from A.C. lines L1 and L2. Voltage source 58 supplies a negative conductor 60, a positive 12-volt conductor 61 and a positive 35-volt conductor 62. A conductor 63 connects negative conductor 60 to the negative terminal 5 of the controlled rectifier 3 to provide negative connection. Conductors 60, 61 and 62 shown in FIG. 1a connect to terminals 64, 65 and 66 shown in FIG. 1b.

A three-phase firing circuit 67 is provided with means for supplying adjustable phase angle firing voltage pulses to controlled rectifier 3 which may preferably be of the silicon controlled rectifier type. These firing pulses are carried from the firing circuit 67 to controlled rectifier 3 via suitable conductors within a conduit 68. The 35-volt power supply of conductors 60 and 62 is connected to firing circuit 67 by conductors 69 and 70. The phase angle of firing pulses of firing circuit 67 and consequently the magnitude of voltage output from controlled rectifier 3 are varied in accordance with the magnitude of the signal voltage impressed on an input signal conductor 71. Firing circuit 67 is shown as a rectangle for the sake of simplicity and reference may be had to R. W. Spink copending application Ser. No. 248,314, filed Dec. 31, 1962, now Patent No. 3,281,645, issued Oct. 25, 1966 for a detailed illustration and description of a circuit suitable for this purpose, this copending application being assigned to the assignee of this invention.

The inverter firing circuit is of the ring shift register type having six outputs and a single input. A somewhat similar firing circuit but without phase reversal is shown in the copending R. L. Risberg application Ser. No. 382,270, filed July 13, 1964, and assigned to the present assignee. The pulse train input is applied to a conductor 72 and is the output of a relaxation oscillator of a well known unijunction transistor type. The oscillator includes a unijunction transistor 73 having a base 74, a base 75 and an emitter 76. The interbase voltage is supplied from positive 35-volt conductor 62 through a temperature compensating resistor 77 and a load resistor 78 to a negative conductor 79. Conductor 79 is connected to conductor 60 when a switching silicon controlled rectifier (SCR) 80 is fired. A gate resistor 81 is connected between the gate and cathode of SCR 80. SCR 80 is rendered conductive by the closure of contacts 82a of start switch 82 to connect the anode of SCR 80 to its gate. The relaxation oscillator further comprises a capacitor 83 between emitter 76 and conductor 79 and a resistor 84 which provides a minimum frequency signal to emitter 76 below which frequency the relaxation oscillator will not operate.

The inverter firing circuit comprises ten pilot silicon controlled rectifiers G, H, J, K, M, N, P, Q, S and T. The positive 12-volt supply is obtained from a conductor 85 which is connected to positive conductor 61 through a unidirectional diode 86. The anodes of the ten SCR's of the firing circuit are arranged to be connected to the positive conductor 85 through the center-tapped primary windings of three output transformers TR1, TR2 and TR3. Transformers TR1–3 are provided with pairs of secondary windings 87, 88, 89, 90, 91 and 92 which are connected to output conductor pairs 36, 37, 44, 45, 53 and 52, respectively. It can be seen therefore that transformer TR1 is effective to supply control signals to the gates of phase I SCR's A and D. Similarly, transformer TR2 supplies the phase II SCR's B and E, and transformer TR3 supplies phase III SCR's C and F. The center tapped primary winding of transformer TR1 consists of halves 93 and 94. Similarly, transformer TR2 has half primary windings 95 and 96, and transformer TR3 has half primary windings 97 and 98. As indicated by the broken lines, the two sets of windings of each transformer TR1–3 have a common core. With this arrangement, when one set of windings provides a positive voltage "on" signal, the associated set of windings on the same core provides a negative voltage "off" bias.

The cathodes of SCR's G and N are connected together by a phase I common conductor 99 and to negative conductor 79 through a bias diode 100. A bias voltage is supplied to conductor 99 from conductor 85 through a resistor 101. The cathodes of CR's H, K, P and S are connected to a common conductor 102. For the purposes of description the two directions of operation of the motor will be called "raise" and "lower" as would occur in a hoist. Common conductor 102 will be called the "raise" common conductor. A bias diode 103 connects "raise" common conductor 102 to a conductor 104. A bias resistor 105 is connected between "raise" common conductor 102 and conductor 85. The cathodes of CR's J, M, Q and T are connected to a "lower" common conductor 106. A bias resistor 107 is connected between conductor 106 and conductor 85. A bias diode 108 connects conductor 106 to a conductor 109. At this point it can be seen that if the conductors 104 and 109 are alternately connected to the negative voltage source, the two groups of SCR's which are respectively connected to these conductors will correspondingly become alternately effective. As will be seen later, it is the alternative selection of one group or the other of these SCR's by which phase reversal in the inverter 11 is accomplished whereby the motor 2 may be reversed from the "raise" to "lower" direction and vice versa.

Each of the primary windings of transformers TR1, TR2 and TR3 are connected to more than one of the SCR's of the firing circuits. Windings 93 and 94 which are associated with phase I are connected directly to the anodes of SCR's G and N, respectively, and each can be energized only through its respective SCR. The phase II transformer TR2 has its primary windings each connected to two alternately effective SCR's. Winding 95 is connected through a unidirectional conducting diode 110 to the anode of SCR K and through a similar diode 111 to the anode of SCR Q. Winding 96 is connected through a unidirectional conducting diode 112 to the anode of SCR J and through a similar diode 113 to the anode of SCR S. The primary windings of the phase III transformer TR3 are connected in a manner similar to those of transformer TR2. Winding 97 is connected through diodes 114 and 115 to the anodes of SCR's H and T, respectively. Winding 98 is connected through diodes 116 and 117 to the anodes of SCR's M and P, respectively.

Resistors 118 through 123 are connected across the primary winding halves of output transformers TR1, TR2 and TR3 to provide a small auxiliary resistive load to improve the quality of the output voltage square wave.

Gate resistors 124 through 133 are connected from the respective gates of SCR's G, H, J, K, M, N, P, Q, S and T, to the associated one of negative or ground conductors 79, 104 and 109.

Each pilot SCR in the shift register is provided with at least one capacitor-diode gate circuit for controlling the firing signals at the gates thereof, SCR's G and N each having two such capacitor-diode gates. Each capacitor-diode gate comprises a diode and capacitor in series between input conductor 72 and the respective SCR gate. The inhibit signal is introduced at the juncture of the capacitor and diode through an associated resistor. The capacitor-diode gates of SCR G consist of diode D1 and capacitor C1 in series with the inhibit signal introduced through resistors R1 and capacitor C2 and diode D2 in series with the inhibit signal introduced through resistor R2. The similar components of the capacitor-diode gates of the other SCR's are identified as diodes D3 through D12, capacitors C3 through C12 and resistors R3 through R12. The anode of each pilot SCR of the shift register is connected through at least one of resistors R1 through R12 a capacitor-diode circuit of at least one succeeding pilot SCR to inhibit gating signals thereto. For this purpose the anode of SCR G is connected through resistors R3 and R4 to inhibit gating signals to SCR H and SCR J, respectively, when SCR G is nonconductive. Similarly, the anode of SCR H is connected through resistor R5 to inhibit signals to SCR K when SCR H is nonconductive and the anode of SCR J is connected through resistor R6 to inhibit signals to SCR M when SCR J is nonconductive. The anodes of SCR's K and M are connected, respectively, through resistor R8 and resistor R7 to inhibit gating signals to SCR N. The anode of SCR N is connected through resistors R9 and R10 to inhibit gating signals to SCR's P and Q. The anodes of SCR's P and Q are connected through resistors R11 and R12, respectively, to inhibit signals to SCR's S and T, respectively. The two parallel rings are completed by connecting the anodes of SCR's S and T through resistors R1 and R2 to inhibit signals to SCR G.

To control the commutation of the SCR's in a predetermined order, a small resistor and a commutating capacitor in series are connected between the anode of each pilot SCR in the shift register and the anode of the pilot SCR which at the same time controls the operation of the opposite leg of the respective half-bridge of rectifier 11. For this purpose, capacitor 134 and resistor 135 are connected between the anodes of SCR's G and N. Similarly, resistor 136 and capacitor 137 connect the anodes of SCR's H and P, resistor 138 and capacitor 139 connects the anodes of SCR's J and Q, resistor 140 and capacitor 141 connect the anodes of SCR's K and S, and resistor 142 and capacitor 143 connect the anodes of SCR's M and T.

Dummy load resistors 145 through 152 are connected from conductor 85 to the respective anodes of the reversible SCR's of the shift register to provide a holding current through the respective SCR's upon the initial firing following a shift from one set of the phase II and III SCR's to the other to accomplish phase reversal.

Each of SCR's G, H, J, K and M are furnished with a derivative network to deliver a firing pulse to the gate thereof upon start-up. For this purpose a resistor 153 and a diode 154 are connected in parallel with each other from conductor 85 through a capacitor 155 to the gate of SCR G. Similarly, SCR's H, J, K and M are furnished with derivative circuits comprising resistors 156 through 159, diodes 160 through 163 and capacitors 164 through 167.

The operation of the shift register firing circuit will now be explained.

When start switch 82 is closed SCR 80 is fired to deliver a sharply negative going voltage to conductor 79 and consequently to conductor 99 through diode 100. Because of this sharp drop the derivative network consisting of diode 154, resistor 153 and capacitor 155 delivers a firing pulse to SCR G and SCR G consequently becomes conductive. As will be seen later, conductor 104 will almost simultaneously be connected to the negative conductor 79. Consequently, the derivative networks associated with SCR's H and K will cause gating signals to be delivered to the gates thereof to render them conductive. As a result of the firing of the SCR's G, H and K, SCR's A, F and B in the inverter will be rendered conductive. Assuming the shift register is to be operated in the "raise" phase sequence, the "raise" sequence will commence in the shift register. Since SCR's G, H and K are conductive, the inhibit signals are removed from the capacitor-diode gates of SCR's H, J, K and N. Since SCR's H and K are already conductive and the cathode of SCR J is not connected to ground, the first firing pulse in conductor 72 from the unijunction oscillator comprising unijunction transistor 73 will affect only SCR N which will be thereby rendered conductive. Since the anodes of SCR's N and G are connected by commutating capacitor 134, SCR G will be turned "off." At the same time a firing pulse is delivered to SCR D in the power inverter. The firing of pilot SCR N also removes the inhibit signal from the gates of SCR's P and Q. The next pulse carried by conductor 72 will fire SCR P. SCR Q will not be affected since conductor 106 is not connected to the negative voltage conductor 79. The firing of SCR P turns off SCR H by commutation and fires power SCR C to commence the "raise" phase sequence in the A.C. power to motor 2. Further, the inhibit signal is removed from the gate of SCR S. In like manner, SCR S is next fired and the shift register continues to operate with three SCR's conductive at all times and advances in the "raise" SCR sequence of G, H, K, N, P, S, G, etc. The inverter consequently operates in the "raise" SCR sequence of A, F, B, D, C, E, A, etc.

When the system is to be operated in the "lower" sequence conductor 109 will be connected to ground and conductor 104 disconnected after the firing of SCR N in a manner to be described. The derivative circuit of SCR J comprising resistor 157, diode 161 and capacitor 165 and the like derivative circuit of SCR M will cause these two SCR's to fire. The next pulse of conductor 72 will cause SCR Q to fire to commence the "lower" sequence. The shift register will consequently operate with three SCR's always conducting in the "lower" sequence of G, J, M, N, Q, T, G, etc. and the inverter 11 will operate in the "lower" SCR sequence of A, E, C, D, B, F, A, etc. Thus, by alternately switching conductors 104 and 109 to the negative voltage source, phase reversal of the three-phase power to motor 2 is accomplished.

The direction and speed of rotation of motor 2 is manually controlled by the operator by controlling the position of a center tapped potentiometer 168 having a slider 168a movable on the center tapped resistance consisting of a "raise" portion 168b and a "lower" portion 168c. A limit switch 169 having contacts 169a, 169b, 169c and 169d is mechanically connected to potentiometer 168 so that when slider 168a is on portion 168c contacts 169a and 169d are closed and contacts 169b and 169c are open. Further, when slider 168a is moved to portion 168b, contacts 169b and 169c close and contacts 169a and 169d open.

The two halves 168b and 168c are alternately energized with voltage from conductors 60 and 62 by circuit means including contacts 169a, 169b and a pair of SCR's U and V. A conductor 170 connects the center tap of potentiometer 168 to conductor 60. A resistor 171 connects the positive 35-volt D.C. conductor 62 to contacts 82b of start switch 82. When contacts 82b are closed a positive voltage is delivered to contacts 169a and 169b. With contact 169a closed as shown in FIG. 1b and if SCR U is conductive, the D.C. voltage is impressed through SCR U and across portion 168c of the speed setter potentiometer 168. A capacitor 172 and a resistor 173 are connected in series from the anode to the cathode of SCR U to protect SCR U from rapid changes in voltage upon switching contacts 82b or 169a. The secondary winding of a transformer 174 is connected across the gate and cathode of SCR U to deliver firing pulses thereto. A gate resistor 175 is SCR U to deliver firing pulses thereto. A gate resistor 175 is also connected from the gate to the cathode of SCR U.

A similar circuit is provided to energize the "raise" portion 168b of potentiometer 168. When contacts 169b are closed and SCR V is rendered conductive the D.C. voltage from conductors 60 and 62 through resistor 171 and contacts 82b is impressed across portion 168b. SCR V also has a capacitor 176 and a resistor 177 in series from the anode to cathode for protection from rapid voltage changes. The secondary winding of a transformer 178 is connected across the gate and cathode of SCR V to deliver firing pulses thereto. A gate resistor 179 is also connected between the gate and cathode of SCR V.

Each of SCR's U and V may be fired by pulses from their respective transformers 174 and 178 only when the firing circuit for inverter 11 is operating in the corresponding phase sequence. For this purpose a conductor 180 and a coupling capacitor 181 (FIG. 1c) connect one side of the primary winding of transformer 174 to the positive conductor 85, and a conductor 182 connects the opposite side of the primary winding of transformer 174 to the anode of SCR J. Consequently, each time SCR J is fired a pulse will be delivered through transformer 174 to the gate of SCR U. Further, since SCR J operates only during the "lower" sequence, SCR U may be fired only during the "lower" sequence. Similarly, the primary winding of transformer 178 is connected through a conductor 183 and a capacitor 184 to the anode of SCR H in the "raise" sequence and through a conductor 185 to conductor 85. SCR V may therefore only be fired during the "raise" sequence.

The speed signal voltage appearing on slider 168a is carried to the base of an emitter follower amplifier transistor 186, through a resistor 187. A capacitor 188 is connected between the base of transistor 186 and conductor 60 and together with resistor 187 forms an RC network for providing a time delayed rate of change of the signal at the base of transistor 186.

During the periods in which no signal appears on slider 168a or such signal is of a very low value, a minimum speed signal is provided to the base of transistor 186 through a unidirectional conducting diode 189. First assuming the inverter 11 is operating in the "raise" sequence and conductor 109, for reasons hereinafter explained, is not connected to negative conductor 79, the minimum voltage signal is approximately that which appears on a slider 190a of an adjustable potentiometer 190 is connected in series with a dropping resistor 191 across the D.C. supply conductors 61 and 60. A resistor 192 connects the slider 190a to diode 189. During the "lower" sequence, conductor 109, is as hereinafter explained, switched to the negative conductor 79. A diode 193 connected to the juncture of diode 189 and resistor 192 becomes conductive and current flows through diode 193 and through a series resistance 194. This current flow causes the voltage at the juncture of resistor 192 and diode 189 to drop. Consequently, the minimum speed signal to the base of transistor 186 also drops. By this means the minimum speed signal is made unsymmetrical in that the minimum speed signal is higher when the inverter system operates in the "raise" sequence than it is when the system operates in the "lower" sequence.

The speed signal output of transistor 186 appears across the load resistor 195 and is transmitted through a resistor 196 to the base of a comparator transistor 197.

Current limit means are provided at this point. A conductor 198 connects the negative power conductor 9 to one side of an adjustable current limit potentiometer 199, the other side being connected through conductor 60 to the opposite side of the IR dropping resistor 10. A slider 199a on potentiometer 199 may be adjusted to provide the desired degree of current limit control. The motor 2 might typically be limited to 150% rated current. As can be seen, the voltage on slider 199a will vary in proportion to the magnitude of the load current passing through resistor 10. Slider 199a is connected through a resistor 200 to the base of a transistor 201 which is operated in the amplifying mode. A capacitor 202 is connected between the base of transistor 201 and conductor 60 and together with resistor 200 forms an RC filter. A resistor 203 and a resistor 204 are connected in series between conductor 61 and conductor 60 and at their juncture are connected to the emitter of transistor 201 to provide an "off" bias. The collector of transistor 201 is connected to the base of comparator amplifier transistor 197. As the current limit signal on slider 199a increases and becomes sufficiently high, transistor 201 becomes conductive to form a variable shunt between the base of transistor 197 and conductor 60. As the current limit signal becomes sufficiently high, the signal appearing at the base of transistor 197 is limited.

The comparator transistor 197 is operated in the amplifying mode. A resistor 205 and a feedback resistor 206 are connected in series and at their juncture are connected to the emitter of transistor 197 to provide an "off" bias. A load resistor 207 is connected between conductor 62 and the collector of transistor 197 and the speed signal output appears thereacross.

A voltage feedback conductor 208 conveys a voltage signal from the positive power conductor 7 to one side of a resistor 209. The other side of resistor 209 is connected to the emitter of transistor 197 to furnish a voltage feedback signal thereto. Transistor 197 therefore functions to compare the speed reference signal on its base with the voltage feedback signal at its emitter, the output voltage appearing at its collector. This output signal voltage is conveyed through a resistor 210 to the input signal conductor 71 of the firing circuit 67. A capacitor 211 is connected between conductor 62 and the input conductor 71, capacitor 211 and resistor 210 forming an RC circuit for smoothing the voltage signal. The signal appearing at conductor 71 functions as heretofore described to control the magnitude of the output of rectifier 3.

The D.C. power voltage signal of conductor 208 is also conveyed by conductor 212 and resistor 213, in series, to the emitter of the unijunction transistor 73. As heretofore explained, the frequency of the output varies in proportion to the signal on the emitter of unijunction transistor 73. Therefore, it is characteristic of the motor control system here described that the frequency of the power delivered to motor 2 generally varies in proportion to the magnitude of the voltage of the power delivered thereto. This provides substantially constant volt-seconds per half cycle of power and therefore insures a substantially constant torque operating characteristic.

There are also means provided for preventing phase reversal at other than low motor speeds. The speed range within which phase reversal is permitted will be referred to as the plugging zone. For this purpose, a resistor 214 and a resistor 215 are connected between the voltage feedback conductor 208 and conductor 79 to form a voltage divider. At their juncture they are connected to the base of a transistor 216. A zener diode 217 is connected between the base of transistor 216 and conductor 79 to limit the magnitude of the signal appearing at the base of transistor 216 to about 6 volts. Transistor 216 and a transistor 218 form a two-stage "on-off" transistor switch.

The collector of transistor 216 is connected to conductor 61. The emitter of transistor 216 is connected to conductor 79 through a minimum load resistor 219 and to the base of transistor 218. A resistor 220 and a resistor 221 are connected in series between conductor 61 and conductor 79 and at their juncture provide an "off" bias to the emitter of transistor 218 when the system is operating in the "raise" sequence. When the system operates in the "lower" sequence, conductor 109 is switched to the negative conductor 79 as hereinafter explained. A diode 222 thereupon becomes conductive and current flow therethrough and through a resistor 223 in series causes the "off" bias at the emitter of transistor 218 to be reduced. Typically the "off" bias might be 4 volts for the "raise" sequence and 2 volts for the "lower" sequence. The collector of transistor 218 is connected to the emitter of a unijunction transistor 224. When the voltage at the base of transistor 216 goes above the "off" bias of transistor 218, transistor 218 switches "on" and the emitter of unijunction transistor 224 is held at about 6 volts.

Unijunction transistor 224 is the active element of plugging zone oscillator 225 of the unijunction transistor relaxation oscillator type. A capacitor 226 is connected between the emitter of transistor 224 and conductor 60. The charging current for capacitor 226 is provided from the positive 35-volt conductor 62 through a resistor 227. The interbase voltage is provided through a resistor 228 from conductor 62 to one of the bases of transistor 224 and from conductor 79 through a load resistor 229 to the other base at which point the output of the relaxation oscillator 225 appears. The relaxation oscillator is designed so as to not operate when the input voltage at the emitter of unijunction transistor 224 is held at about 6 volts when transistor 218 is turned "on." When transistor 218 is turned "off" the voltage on the emitter of unijunction transistor 224 will rise because of current flow through resistor 227 to charge capacitor 226 and the oscillator 225 will begin to function. As a result, an output train of pulses will appear in a conductor 230. As can be seen oscillator 225 will operate only when the voltage feedback in conductor 208 indicates low motor speeds within the "plugging zone."

As has been previously pointed out, the motor control system is caused to accomplish phase reversal by the alternate switching of one or the other of conductors 109 and 104 to the negative conductor 79. When conductor 109 is switched to negative, the "lower" sequence is initiated and conductor 104 is similarly associated with the "raise" sequence. The means for switching these conductors to the negative conductor 79 comprises a pair of alternately conductive SCR's L and R. The cathodes of each of these SCR's are connected to conductor 79. The anode of SCR L is connected to the "lower" conductor 109 and the anode of SCR R is connected to the "raise" conductor 104. The anodes of SCR's L and R are connected to the positive conductor 61 through load resistors 231 and 232, respectively. A resistor 233 and a commutating capacitor 234 are connected in series between the anodes of SCR's L and R to cause one of these SCR's to turn "off" when the other is turned "on." A pair of gate resistors 235 and 236 are connected between the cathodes and gates of SCR's L and R, respectively. The gate of SCR L is furnished with a capacitor-diode gate comprising, in series, a capacitor 237 and a diode 238 with an "inhibit" resistor 239 connected at their juncture. Similarly, the gate of SCR R is connected to a capacitor-diode gate comprising, in series, a capacitor 240 and a diode 241, with an "inhibit" resistor 242 connected to their juncture.

The firing pulses of SCR's L and R are supplied from a transformer 243 having a primary winding 243a and two secondary windings 243b and 243c. One side of winding 243b is connected through conductor 79 to the cathode of SCR L and the other side connects through a resistor 244 to diode 238 through which positive firing pulses are carried to the gate of SCR L. Similarly, one side of winding 243c is connected to the cathode of SCR R with its other side connected to diode 241 through a resistor 245. one side of the transformer primary winding 243a is connected to the conductor 230 and the other side is connected to the negative conductor 79. It can be seen that transformer 243 will only provide pulses when the relaxation oscillator 225 becomes operative in the "plugging zone" at low speeds.

The choice as to which of SCR's L or R is turned "on" is accomplished through contacts 169c and 169d of the manually operable potentiometer 168. When potentiometer 168 is in the "raise" position contacts 169c are closed to effectively short out any firing pulses which might otherwise be delivered to the gate of SCR L. SCR L consequently cannot be turned "on". One side of contacts 169c are connected to conductor 79 through a conductor 246. The other side of contacts 169c is connected through a diode 247 to the junction of resistor 244 and diode 238. A resistor 248 and a capacitor 249 are connected in series across contacts 169c to suppress "noise" and provide a time delay in the firing of SCR L upon opening of contacts 169c. About three pulses of winding 243b will be required to charge capacitor 249 before SCR L can be fired. A similar circuit is provided for the control of SCR R. When potentiometer 168 is in the "lower" position as shown in FIG. 1b, contacts 169d in series with a diode 250 short out pulses from winding 243c to prevent firing of SCR R. A resistor 251 and a capacitor 252 across contacts 169d serve a similar function to that of resistor 248 and capacitor 249.

A derivative circuit comprising a diode 253, a resistor 254 and a capacitor 255 connects the positive conductor 61 to the gate of SCR R. Upon the initial turning "on" of the system when SCR 80 fires, this derivative circuit serves to deliver a firing pulse to the gate of SCR R. SCR R therefore is always initially fired first but, if the system is to be operated in the "lower" sequence, SCR R will almost immediately be turned "off" when SCR L is turned "on" in the normal manner by pulses from winding 243b.

Means are provided for preventing the firing of either of the SCR's L or R except at the time in the power phase sequence when phase I goes negative, that is, when the phase I SCR D connected to the negative power conductor 9 is fired. By reversing at this time, saturation of the motor 2 is avoided. For this purpose, an inhibit signal is impressed through a resistor 256 and resistors 239 and 242 to the capacitor-diode gates of SCR's L and R. Neither of these SCR's can therefore be fired by pulses from transformer 243 unless this inhibit signal is removed.

A resistor 257 and a capacitor 258 in series, connect the anode of SCR N to the juncture of resistors 256, 239 and 242. When SCR N is fired to cause the firing of SCR D, the anode of SCR N goes rapidly negative. This causes a momentary drop in voltage at the juncture of resistors 256, 239 and 242 to momentarily remove the inhibit signal. The time constant of capacitor 258, resistor 256 and resistor 257 is such that the inhibit signal is removed for a period of time to allow about six pulses to pass to the gate of either SCR L or SCR R. One or the other of SCR L and R may therefore be fired during this time to accomplish phase reversal.

A diode 259 is connected across resistor 256 to prevent misfiring of SCR L by positive pulses upon the turning "off" of SCR N.

The start-up of certain elements of the control will now be described.

When the start switch 82 is closed SCR 80 is fired to cause a sharp drop in the voltage of conductor 79. This causes SCR G and SCR R to be fired through their derivative gating circuits. When SCR P is fired conductor 104 goes rapidly negative to cause the "raised" SCR's H, K to be fired and the "raise" sequence in initiated. However, if potentiometer 168 is in the "lower" position, reversal of the sequence must take place. When SCR N is fired in sequence, the inhibit signal to SCR L is removed. Since the motor 2 is just starting, its speed is, of course, within the "plugging zone" and oscillator 225 is operating. As a consequence SCR L is fired and SCR R is turned "off". The switching of conductor 109 to negative causes SCR's J and M to be fired to initiate the "lower" sequence.

When potentiometer 168 is moved from "lower" to "raise" position or vice versa at higher speeds, the motor is permitted to slow down as the voltage on the time reference capacitor decays with potentiometer 190 furnishing a minimum voltage reference signal. When the voltage feedback, proportional to speed, reaches the "plugging zone" phase reversal is permitted to take place and potentiometer 168 is again energized to provide the desired speed reference signal.

The dissymmetry in the plugging zone and the minimum speed reference signal have an advantage where the load is "live" as with a hoist. When the motor 2 is motoring there is a voltage drop in the motor stator winding and, in order to maintain the magnetizing voltage and the motor flux, a higher minimum voltage is required. When the motor 2 is generating, there is a voltage rise in the motor and this problem does not exist. A lower minimum voltage and speed may therefore be permitted in the generating or "lower" sequence. This dissymmetry in the control therefore provides a minimum difference between the two opposite minimum speeds and a narrow "plugging zone" for smoothness of motor operation during reversal.

I claim:

1. An inverter system supplied from a source of direct current and providing a three-phase output voltage with reversible phase order comprising:
    a three-phase inverter comprising three half-bridges each comprising two legs and connected in parallel with one another across said source of direct current;
    first control means comprising pilot circuits for each of said half-bridges being energizable in a sequence to render said legs conductive in a corresponding first sequence for producing a first phase sequence in said three-phase output voltage; and
    second control means for at least two of said three half-bridges comprising additional pilot circuits for the associated half-bridges and energizable in a sequence with the operable pilot circuits for all of said three half-bridges for rendering said legs conductive in a different corresponding sequence for producing a second phase sequence in said three-phase output voltage;
    said first and second firing control means being alternately and selectively operable to reverse the phase sequence of said three-phase output.

2. The invention as defined in claim 1, in which said first and second inverter control means are effective during reversal to reverse two of the three phases of said three-phase output voltage while the third phase remains continuous in its original sequential order, together with:
    switching means operable to make said first and second inverter control means alternately operable; and
    means for permitting operation of said switching means only at the time when said third phase passes from positive voltage to negative voltage.

3. An inverter system supplied from a source of direct current and providing a three-phase output voltage with reversible phase order comprising:
    a three-phase solid state inverter comprising a three-phase silicon controlled rectifier inverter having three half-bridges each comprising two legs and connected in parallel with one another across said source of direct current;
    first firing control means comprising individual pilot firing circuits for each of said legs of each of said half-bridges being energizable in a sequence to fire the silicon controlled rectifiers of said inverter in a corresponding first sequence for producing a first phase sequence in said three-phase output voltage; and second firing control means for at least two of said three half-bridges comprising additional individual pilot firing circuits for associated legs of said half-bridges and energizable in a sequence with the operable firing circuits for all of said three half-bridges for firing said silicon controlled rectifiers in a different corresponding sequence for producing a second phase sequence in said three-phase output voltage;

said first and second firing control means being alternately and selectively operable to reverse the phase sequence of said three-phase output.

4. The invention as defined in claim 3, in which:

said inverter comprises a power carrying silicon controlled rectifier in each of the six legs of said inverter; and each of said firing circuits comprises a pilot silicon controlled rectifier connected to deliver a gating signal to a corresponding one of said power carrying silicon controlled rectifiers;

and together with solid state switching means for making said first and second firing control means alternately operable, said solid state switching means being connected to render the two sets of pilot silicon controlled rectifiers respectively associated with said first and second firing control means alternately operable.

5. The invention as defined in claim 4, together with oscillator means for delivering firing pulses to said pilot silicon controlled rectifiers, in which:

said solid state switching means is effective to alternately complete the connection through the anode-cathode circuits of said two sets of pilot silicon controlled rectifiers and to further remove blocking gate signals from the gate circuits of the pilot silicon controlled rectifiers of the set made operable by completion of the anode-cathode circuits.

6. The invention as defined in claim 4, in which said first and second firing control means are effective during reversal to reverse two of the three phases of said three-phase output voltage while the third phase remains continuous in its original sequential order, together with:

means responsive to the firing of one of said pilot silicon controlled rectifiers for said third phase for permitting operation of said solid state switching means only at the time when said third phase passes from positive voltage to negative voltage.

7. A three-phase reversible alternating current motor control system comprising:

a three-phase reversible alternating current motor;

a three-phase variable frequency inverter for supplying power to said motor comprising three half-bridges each comprising two legs and connected in parallel with one another across said source of direct current, the frequency of the output of said inverter being substantially determinative of the motor speed;

first control means comprising pilot circuits for each of said legs of each of said half-bridges being energizable in a sequence to render said legs conductive in a corresponding first sequence for producing a first phase sequence in said three-phase output voltage;

second control means for at least two of said three half-bridges comprising additional pilot circuits for the associated legs of said half-bridges and energizable in a sequence with the operable pilot circuits for all of said three half-bridges for rendering said legs conductive in a different corresponding sequence for producing a second phase sequence in said three-phase output voltage;

switching means for making said first and second control means alternately operable; and speed sensitive means responsive to a condition indicative of the speed of said motor for controlling said switching means and for permitting said switching means to change the state of operability of said first and second control means only at relatively low motor speeds, whereby reversal of phases may be accomplished at only relatively low motor speeds.

8. The invention as defined in claim 7 in which:

said switching means comprises solid state switching means; and said speed sensitive means comprises oscillator means operable only at low motor speeds for delivering signals to said solid state switches effective to cause switching thereof.

9. The invention as defined in claim 7, in which said speed sensitive means includes means responsive to the direction of rotation of said motor for changing the speed level at which reversal of said motor is permitted depending on which direction said motor is rotating before reversal.

10. The invention as defined in claim 8, in which said speed sensitive means includes means responsive to the direction of rotation of said motor for changing the speed level at which said oscillator means becomes operable depending on which direction said motor is rotating before reversal.

11. A three-phase reversible alternating current motor control system comprising:

a three-phase reversible alternating current motor;

a three-phase solid state variable frequency inverter for supplying power to said motor comprising a three-phase silicon controlled rectifier inverter having three half-bridges each comprising two legs and connected in parallel with one another across said source of direct current, the frequency of the output of said inverter means being substantially determinative of the motor speed;

first firing control means comprising individual pilot firing circuits for each of said legs of each of said half-bridges being energizable in a sequence to fire the silicon controlled rectifiers of said inverter in a coresponding first sequence for producing a first phase sequence in said three-phase output voltage;

second firing control means for at least two of said three half-bridges comprising additional individual pilot firing circuits for the associated legs of said half-bridges and energizable in a sequence with the operable firing circuits for all of said three half-bridges for firing said silicon controlled rectifiers in a different corresponding sequence for producing a second phase sequence in said three-phase output voltage;

switching means for making said first and second firing control means alternately operable; and speed sensitive means responsive to a condition indicative of the speed of said motor for controlling said switching means and for permitting said switching means to change the state of operability of said first and second firing control means only at relatively low motor speeds, whereby reversal of phases may be accomplished at only relatively low motor speeds.

12. The invention as defined in claim 11, in which:

said switching means comprises solid state switching means; and said speed sensitive means comprises oscillator means operable only at low motor speeds for delivering signals to said solid state switches effective to cause switching thereof.

13. The invention as defined in claim 11, in which said speed sensitive means includes means responsive to the direction of rotation of said motor for changing the speed level at which reversal of said motor is permited depending on the direction said motor is rotating before phase reversal.

14. The invention as defined in claim 12, in which said speed sensitive means includes means responsive to the direction of rotation of said motor for changing the speed level at which said oscillator means becomes operable depending on the direction said motor is rotating before phase reversal.

15. A three-phase reversible alternating current motor control system comprising:
- a three-phase reversible alternating current motor;
- a primary source of alternating current;
- controllable rectifier means supplied from said primary source and being operative to provide a direct current output having a controllable voltage magnitude;
- a first speed signal source for supplying a selectively variable speed signal;
- rectifier control means for applying control signals to said rectifier means and being responsive to the magnitude of said selectively variable speed signal to control the magnitude of the direct current voltage output of said rectifier means;
- a three-phase solid state inverter comprising three half-bridges each comprising two legs and connected in parallel with one another across said direct current output for supplying alternating current output to said motor, said alternating current output having a voltage magnitude substantially proportional to the voltage of the direct current output of said rectifier means;
- control circuit means for controlling the frequency of the output of said inverter substantially in proportion to the voltage magnitude of the direct current output of said rectifier means, said frequency being substantially determinative of the speed of said motor;
- first inverter control means comprising pilot circuits for each of said half-bridges being energizable in a sequence to render said legs conductive in a corresponding first sequence for producing a first phase sequence in said three-phase output voltage;
- second inverter control means for at least two of said three half-bridges comprising additional pilot circuits for the associated half-bridges and energizable in a sequence with the operable pilot circuits for all of said three half-bridges for rendering said legs conductive in a different corresponding sequence for producing a second phase sequence in said three-phase output voltage;
- switching means for rendering said one of said first and second inverter control means non-operative after reduction of said selectively variable speed signal to a relatively low value and substantially rendering the other of said first and second control means operative to accomplish phase reversal; and
- a minimum speed signal source for supplying a minimum speed signal to said rectifier means when the magnitude of said selectively variable speed signal is reduced below the magnitude of said minimum speed signal to maintain the voltage magnitude of said direct current output of said rectifier means at a minimum value.

16. The invention as defined in claim 15, together with means responsive to the direction of rotation of said motor for changing the level of said minimum speed signal depending on the direction said motor is rotating before phase reversal.

17. A three-phase reversible alternating current motor control system comprising:
- a three-phase reversible alternating current motor;
- a primary source of alternating current;
- controllable rectifier means supplied from said primary source and being operative to provide a direct current output having a controllable voltage magnitude;
- speed signal means for supplying a selectively variable speed signal;
- rectifier control means for applying control signals to said rectifier means and being responsive to the magnitude of said selectively variable speed signal to control the magnitude of the direct current voltage output of said rectifier means;
- a three-phase solid state inverter comprising three half-bridges each comprising two legs and connected in parallel with one another across said direct current output to said motor, said alternating current output having a voltage magnitude substantially proportional to the voltage of the direct current output of said rectifier means;
- control circuit means for controlling the frequency of the output of said inverter substantially in proportion to the voltage magnitude of the direct current output of said rectifier means, said frequency being substantially determinative of the speed of said motor;
- first inverter control means comprising pilot circuits for each of said half-bridges being energizable in a sequence to render said legs conductive in a corresponding first sequence for producing a first phase sequence in said three-phase output voltage;
- second inverter control means for at least two of said three half-bridges comprising additional pilot circuits for the associated half-bridges and energizable in a sequence with the operable pilot circuits for all of said three half-bridges for rendering said legs conductive in a different corresponding sequence for producing a second phase sequence in said three-phase output voltage;
- switching means energizable to cause said one or the other of said first and second inverter control means to be operable;
- speed sensitive means responsive to a condition indicative of the speed of said motor for energizing said switching means and for permitting said switching means to change the state of operability of said first and second inverter control means only at relatively low motor speeds, whereby reversal of phases may be accomplished only at relatively low motor speeds;
- speed setter means included in said speed signal means comprising a selectively variable device having signal controlling means divided into first and second separately energizable means, each of said separately energizable means being effective when energized to produce a speed signal, said speed setter means further comprising movable means selectively movable to first and second regions to cooperate with the corresponding first or second of said separately energizable means to produce a speed signal dependent upon the position of said movable means;
- means for energizing said first separately energizable means only when said inverter means is operating in said first phase sequence and when said first separately energizable means is otherwise energizable;
- means for energizing said second separately energizable means only when said inverter means is operating in said second phase sequence and when said second separately energizable means is otherwise energizable;
- first switch means associated with said speed setter means for permitting said speed sensitive means to energize said switching means to render said first inverter control means operable to produce said first phase sequence when said movable member is in said first region;
- second switch means associated with said speed setter means for permitting said speed sensitive means to energize said switching means to render said second inverter control means operable to produce said second phase sequence when said movable member is in said second region;
- third switch means associated with said speed setter means for permitting said first separately energizable means to be energized by its associated energizing means only when said movable member is in said first region;
- fourth switch means associated with said speed setter means for permitting said second separately energizable means to be energized by its associated energizing means only when said movable member is in said second region.

18. The invention as defined in claim 17, together with a minimum speed signal source for supplying a minimum speed signal to said rectifier means when said selectively variable speed signal is reduced below the magnitude of said minimum speed signal and during those intervals during phase reversal when neither one of said separately energizable means of said speed setter means produces a speed signal.

19. The invention as defined in claim 18, together with means responsive to the direction of rotation of said motor for changing the level of said minimum speed signal depending on direction said motor is rotating before phase reversal.

20. The invention as defined in claim 17, together with means responsive to the direction of rotation of said motor for changing the level of motor speed at which said speed sensitive means will permit phase reversal depending on which direction said motor is rotating before phase reversal.

21. The invention as defined in claim 19, together with means responsive to the direction of rotation of said motor for changing the level of motor speed at which said speed sensitive means will permit phase reversal depending on the direction said motor is rotating before phase reversal.

22. The invention as defined in claim 17, in which said speed setter means comprises a center tapped potentiometer having two separately energizable sections; and
said movable member comprises a slider movable selectively over either of said sections; and
said first, second, third and fourth switch means comprise limit switches adapted for actuation by movement of said slider.

References Cited
UNITED STATES PATENTS

| | | | |
|---|---|---|---|
| 2,714,697 | 8/1955 | Small | 318—231 |
| 2,784,365 | 3/1957 | Fenemore et al. | 318—231 XR |
| 3,105,180 | 9/1963 | Burnett | 318—231 XR |
| 3,289,062 | 11/1966 | Dannettell | 318—231 XR |

ORIS L. RADER, *Primary Examiner.*

G. RUBINSON, *Assistant Examiner.*